United States Patent [19]

Huibers et al.

[11] Patent Number: 5,283,319
[45] Date of Patent: Feb. 1, 1994

[54] PROCESS AND CONTROL STRATEGY FOR THE RECOVERY AND USE OF EXCESS CARBON DIOXIDE DISCHARGE FROM A HIGH PRESSURE CARBON DIOXIDE ACIDULATION PROCESS

[75] Inventors: Derk T. A. Huibers, Pennington; Richard G. Grotyohann, Belle Mead; Andrew M. Robbins, Trenton, all of N.J.

[73] Assignee: Union Camp Corporation, Princeton, N.J.

[21] Appl. No.: 82,339

[22] Filed: Jun. 23, 1993

[51] Int. Cl.$^5$ .................................................. C09F 1/00
[52] U.S. Cl. ...................................... 530/209; 530/205; 530/230
[58] Field of Search .................... 530/209, 205, 230

[56] References Cited

U.S. PATENT DOCUMENTS

| | | | |
|---|---|---|---|
| 1,888,581 | 11/1932 | Bent | 530/209 |
| 2,515,739 | 7/1950 | Smerechniak et al. | 260/97.7 |
| 3,901,869 | 8/1975 | Bills | 260/97.5 |
| 4,075,188 | 2/1978 | Vardell, Jr. | 260/97.7 |
| 4,495,095 | 1/1985 | Lawson et al. | 260/97.7 |

OTHER PUBLICATIONS

*Westvaco's Carbon Dioixde Process*, Feb. 28–Mar. 2, 1989, Charleston, S.C.
Smook, G. A., *Handbook for Pulp & Paper Technologists*, 6th Edition, Feb. 1989; pp. 146–148.
McSweeney, E. E., *Sulfate Naval Stores*, (as reported in Naval Stores; Production, Chemistry, Utilization), pp. 165–168 Jun. 1993.

*Primary Examiner*—Harold D. Anderson
*Attorney, Agent, or Firm*—Woodcock Washburn Kurtz Mackiewicz & Norris

[57] ABSTRACT

The present invention provides for the efficient recycling of carbon dioxide used in high pressure tall oil soap acidulation processes. The excess carbon dioxide used in the high pressure tall oil soap acidulation processes is recycled and contacted with an aqueous tall oil soap solution at a point before the high pressure contacting stage. Preferably, the recycled carbon dioxide is contacted in a first reactor, under pressure, to provide a preliminary tall oil mixture having an extent of acidification beyond the presence of a gel phase. Methods are provided for the monitoring of the acidulation reaction in the first reactor to maintain the extent of acidification beyond the gel phase region.

23 Claims, 2 Drawing Sheets

PROCESS AND CONTROL STRATEGY FOR THE RECOVERY AND USE OF EXCESS CARBON DIOXIDE DISCHARGE FROM A HIGH PRESSURE CARBON DIOXIDE ACIDULATION PROCESS

FIELD OF THE INVENTION

The present invention relates to the production of crude tall oil from tall oil soap. More specifically, the invention relates to such processes using high pressure carbon dioxide as an acidification agent.

BACKGROUND OF THE INVENTION

The acidulation, or acidification, of tall oil soap is an important process for manufacturing crude tall oil. Tall oil soap, which contains salts of resin acids and fatty acids, is produced as a chemical by-product of the kraft pulping process of coniferous woods, especially pine. The kraft pulping process is described in detail in *The Handbook For Pulp & Paper Technologists*, G. A. Smook, (1989).

As set forth in U.S. patent application No. 3,901,869, the acidulation of tall oil soap is preferably conducted with carbon dioxide, under pressure. During the acidulation process, excess carbon dioxide utilized therein acquires small quantities of hydrogen sulfide and mercaptans. The excess carbon dioxide therefore cannot be vented to the atmosphere without costly pretreatment, such as scrubbing with a caustic soda solution.

This excess carbon dioxide has significant economical value as a reactant in the acidulation process. One alternative for reprocessing this carbon dioxide is to recompress the gas to the required high reaction pressures. However, such a recompression operation would be costly in itself, since water and entrained material must be removed from the gas stream. Also, the recompression equipment is expensive.

Therefore, a need exists within the art of processing tall oil soap into crude tall oil to develop processing systems that can beneficially use the excess carbon dioxide utilized during the high pressure acidulation reaction. The solution to this problem should itself be one which is economical and environmentally sound.

SUMMARY OF THE INVENTION

The present invention provides processes for the acidification, or acidulation, of tall oil soap to produce crude tall oil wherein excess carbon dioxide from a high pressure contacting step is recycled.

In one embodiment, an aqueous tall oil soap solution that contains tall oil soap is contacted with carbon dioxide at a first pressure to form a preliminary tall oil mixture containing a minor proportion of crude tall oil and sodium bicarbonate and a major proportion of unreacted tall oil soap. This preliminary tall oil mixture is then again contacted with carbon dioxide, at a second pressure which is higher than the first pressure, to form a crude tall oil mixture containing a major proportion of crude tall oil and sodium bicarbonate and a minor proportion of unreacted tall oil soap. The crude tall oil produced and excess carbon dioxide utilized in the second contacting step are then recovered and at least a portion of the carbon dioxide is recycled back to the first contacting step.

Preferably, the crude tall oil mixture is allowed to separate, under pressure, into an organic phase comprising crude tall oil and an aqueous phase comprising sodium bicarbonate. Preferably, the pressure for this separation step is similar to those pressures used in the second contacting step.

The first contacting step is preferably conducted in a first reactor operated under continuous fashion. The extent of acidification of the preliminary tall oil mixture is preferably maintained at a point beyond which a gel phase will exist. The extent of acidification can be monitored using various physical and chemical means, however it is preferred to monitor the viscosity of the mixture. Various process variables can be used to adjust the extent of acidification in the first reactor to maintain the extent of the acidification beyond the gel phase region, such as the feed rate of the aqueous tall oil soap solution, the carbon dioxide, and the water, along with the pressure and temperature of the reactor.

DETAILED DESCRIPTION OF THE INVENTION

Figure 1:
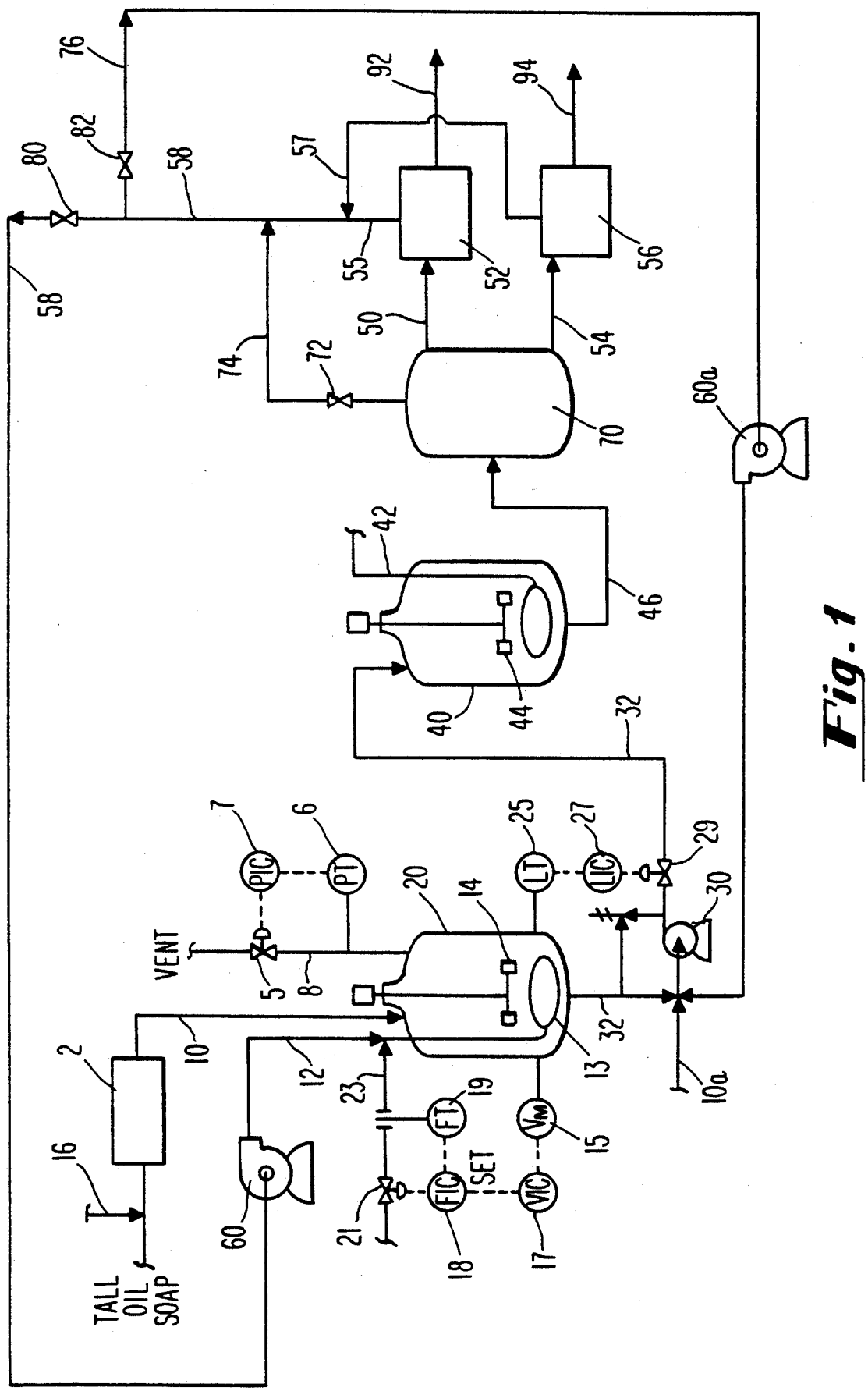
FIG. 1 is a schematic flow diagram of a crude tall oil production system utilizing the present invention.

The preparation of crude tall oil from tall oil soap is accomplished by the acidification, or acidulation, of the salts of the resin and fatty acids contained in the soap. The tall oil soap is commonly produced from a kraft pulping process of wood chips. This process is explained in detail in *The Handbook For Pulp & Paper Technologists*, G. A. Smook, (1989).

In general, the acidification reaction is conducted in the presence of carbon dioxide and proceeds as follows:

$$RCOONa + CO_2 + H_2O \rightleftharpoons RCOOH + NaHCO_3$$

| tall oil soap | carbon dioxide | water | crude tall oil | sodium bicarbonate |

The acidulation of the tall oil soap is conducted under pressure, and the crude tall oil and sodium bicarbonate preferably are allowed to separate under pressure.

The present invention provides for the beneficial recycling of the excess carbon dioxide used during the high pressure acidulation processes such as those described in U.S. patent application Ser. No. 07/886,654 to Huibers et al. which is incorporated herein in its entirety and U.S. Pat. No. 3,901,869 to Bills which is also incorporated herein in its entirety. Generally, at least about 80 percent of the excess carbon dioxide from the high pressure acidulation step is recycled, preferably at least about 90 percent, more preferably at least about 95 percent. Most preferably, substantially all of the carbon dioxide (i.e. about 99%) is recycled. The carbon dioxide is directed back into the processing system to a point where it can be reacted with an aqueous tall oil soap solution to form a preliminary tall oil mixture. This preliminary tall oil mixture is then reacted in the manner described by the high pressure acidulation processes noted above.

The tall oil soap used as the raw material for this process is a product of the kraft pulping process and is a greasy type substance with about 10-55, typically 20-45, and more commonly 25-40 weight percent water. This water contains inorganic compounds such as sodium hydroxide and sodium carbonate, which can account for 10-30 equivalent percent of the acidification requirements of the tall oil soap. The remaining 90-70 equivalent percent of the acidification requirement arises from the organic tall oil components of the soap, comprising about 40% by weight fatty acid salts, about 40% by weight resin acid salts, and about 20% by weight neutral components.

The extent of acidification, as defined herein, is the sum of the equivalent percent of the organic salts of the resin and fatty acids present in the initial tall oil soap which are converted to their corresponding acids, plus the equivalent percent of the inorganic components in the initial tall oil soap which are neutralized. The term acidification is used interchangeably with the term acidulation.

Preferably this tall oil soap is diluted with water before being processed according to the present invention to form an aqueous tall oil soap solution. In common practice, the tall oil soap is diluted with water in water:tall oil soap ratios of about 0.5:1 to about 10:1, preferably from about 1:1 to about 5:1, more preferably from about 1:1 to about 2.5:1. Generally, the aqueous tall oil soap solution that is to be processed has a water content of at least about 45 weight percent and below about 95 weight percent, preferably at least about 55 weight percent, more preferably from about 60-90 weight percent, and most preferably from 65-85 weight percent. Preferably, the water content is minimized to avoid costly evaporative process steps after acidulation.

In one embodiment of the processes of the present invention, the aqueous tall oil soap solution is first contacted with carbon dioxide at a first pressure to form a preliminary tall oil mixture. The preliminary tall oil mixture contains unreacted tall oil soap components, the corresponding acidified crude tall oil components, sodium bicarbonate, and water. The extent of the acidification reaction is relatively low in the preliminary tall oil mixture and thus it is then contacted a second time with carbon dioxide at a second pressure higher than the first pressure to form a crude tall oil mixture that contains sodium bicarbonate, crude tall oil, water, and to a lesser extent, unreacted tall oil soap components. The crude tall oil, sodium bicarbonate, and excess carbon dioxide can all then be recovered by conventional means known by one skilled in the art such as, for example, those described in U.S. Pat. No. 3,901,869. Preferably, the crude tall oil mixture is allowed to separate under pressure prior to recovering the products, as described in U.S. patent application Ser. No. 07/886,654. At least a portion of the recovered carbon dioxide is then used in the first contacting step.

The present invention can be described in a particular embodiment by reference to FIG. 1. As shown in FIG. 1, the aqueous tall oil soap solution is prepared by adding water via line 16 to the tall oil soap. The aqueous tall oil soap solution is fed via line 10 into a first reactor 20. Optionally, the aqueous tall oil soap solution can be deaerated prior to its introduction into the first reactor 20 by passing the aqueous tall oil soap solution through a deaeration system 2. Such systems are known to those skilled in the art and include such commercially available systems as the Jaygo thin film vacuum deaeration system available from Jaygo Inc., Mahwah, N.J. Defoamers may be used to aid in the deaeration step, as is known in the art. The air content in the tall oil soap can vary and is typically in the range of about 5-50% by volume. The deaeration is performed to remove air from the aqueous tall oil soap solution to a level of less than about 100 ppm by weight, preferably less than about 50 ppm by weight, more preferably less than about 20 ppm by weight and most preferably about 5 ppm by weight.

The aqueous tall oil soap solution is contacted with carbon dioxide, preferably under pressure, in the first reactor 20. The carbon dioxide is introduced into the reactor by means such as a blower 60 via line 12, preferably through a sparger ring 13. The reactor 20 is preferably operated in a continuous fashion and a preliminary tall oil mixture is withdrawn from the reactor 20 via pump 30. The reactor 20 is preferably a stirred tank reactor, such as by means of an agitator 14.

The flow rates of the principal reactants, the aqueous tall oil soap solution and the carbon dioxide, will depend upon the size of the reactor 20. Generally, the reactor 20 is designed to achieve a residence time of at least about 5 minutes, preferably at least about 10 minutes, more preferably at least about 15 minutes, and most preferably from about 10 to about 25 minutes.

The reactor 20, operated in continuous fashion, is maintained at a temperature of from about 25°-125° C., preferably from about 40°-100° C., more preferably from 55°-85° C. The pressure of the reactor 20 is maintained from about 0-85 psig, preferably from about 5-60 psig, more preferably from about 10-30 psig. The extent of acidification for the preliminary tall oil mixture exiting reactor 20 is generally at least about 20 equivalent percent, more preferably at least about 25 equivalent percent, and most preferably at least about 30 equivalent percent. The upper limit for the extent of acidification is determined by several factors such as the flow rates of the reactants and the reactor conditions; however, practical limitations for the upper limit are about 70 equivalent percent, particularly about 60 equivalent percent, and more particularly 50 equivalent percent.

The reaction of the aqueous tall oil soap solution with carbon dioxide in reactor 2 is preferably conducted under conditions such that a gel phase is avoided in the reactor 20. The gel phase can be described with reference to FIG. 2, which demonstrates a batch-wise process wherein the acidulation reaction will proceed with the aqueous soap solution having initially a relatively low, if any at all, acid conversion and a corresponding viscosity of from about 25-200 cps, preferably from about 50-150 cps, more preferably from about 50-100 cps. The soap solution at this point is a Newtonian fluid and, therefore, viscosities determined under either low or high shear conditions would be similar. This is shown as region "A" in FIG. 2.

As the carbon dioxide reacts with the soap components, the conversion to the corresponding acids occurs. During this process, the gel phase is entered into and the viscosity increases dramatically, as shown by region "B" in FIG. 2. The viscosity of this gel phase is not easily defined due to the non-Newtonian nature of the fluid. The viscosity as measured under high shear conditions can reach at least about 500 cps and may reach as high as 700 cps or more. The viscosity of the gel phase under low shear conditions could reach as high as 10,000-100,000 ps or higher. The viscosity is determined using those methods known in the art. One skilled in the art will know that the relative low and high shear conditions will be dependant upon the type of viscometer used to measure the viscosity. The low shear viscosity can be measured using a Brookfield Model LVT viscometer fitted with a no. 3 spindle at a rotation of 3 rpm, while the high shear viscosity can be measured using commercially available viscometers such as the Viscoliner® Model 1810 from Nametre Co., (Metuchen, N.J.).

Figure 2:
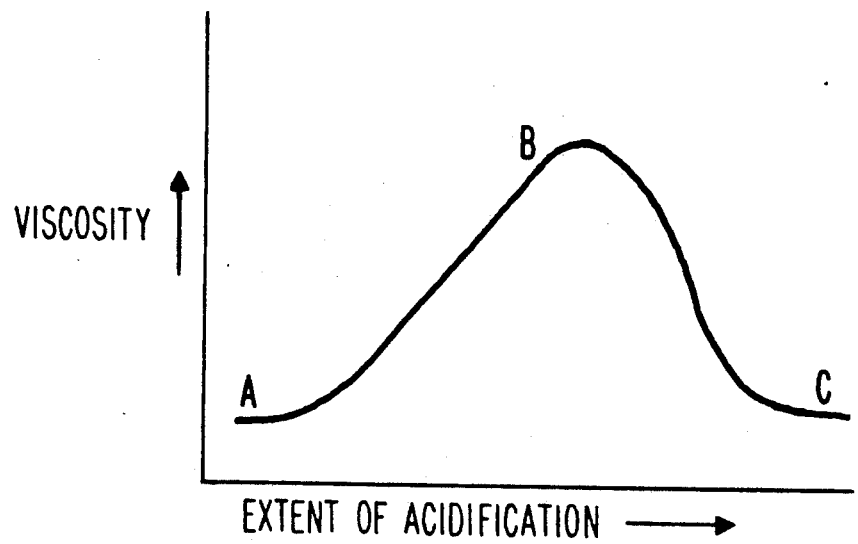
FIG. 2 shows the viscosity as a function of extent of acidification for the acidulation reaction of a tall oil soap solution.

As the extent of acidification proceeds, the gel phase is overcome and the viscosity of the preliminary tall oil mixture decreases as shown by region "C" in FIG. 2, with the viscosity of the mixture falling to below about 400 cps, preferably below about 300 cps, and more preferably from about 25–300 cps. At this point, the preliminary tall oil mixture is Newtonian in nature and viscosity as measured under high or low shear conditions will be similar.

The amount of acid needed for complete acidification of an aqueous tall oil soap solution, known to one skilled in the art as the "soap number", is determined by HCl titration. This analytical technique is an industry standard well known to one skilled in the art. The boundaries of the gel phase were determined by reacting varying amounts of HCl with an aqueous tall oil soap solution of known water content and noting the onset of the gel phase and the subsequent cessation of the gel phase.

The gel phase is initially noticed at an extent of acidification of at least about 10 equivalent percent, generally about 10–20 equivalent percent and particularly about 10–15 equivalent percent, when the water content in the soap solution is from about 60–90% by weight. Generally, the gel phase persists until the extent of acidification reaches about 20–35 equivalent percent, particularly about 25–35 equivalent percent, at which time the viscosity decreases.

While the relationship between the extent of acidification and the viscosity, as noted above, may be descriptive of a tall oil soap solution containing from about 60–90 weight percent water, one skilled in the art, once armed with the discloser of this specification, will realize that the onset of the gel phase, the corresponding increase in viscosity and the related extent of acidification, may all vary depending upon different factors. For example, the onset of the gel phase may be more noticeable when the water content of the aqueous soap solution is lower. Additionally, conditions such as reactant feed rates, temperature and pressure may also affect the point at which one notices the onset of gelation. Suffice is to say that when the steady-state conditions of the reaction are deviated from, i.e. the viscosity increases, the reaction conditions must be adjusted so as to avoid the gel phase.

The presence of the gel phase is disadvantageous in a reactor vessel. If the condition persists, it inhibits the mass transfer of the carbon dioxide through the reaction mixture and the acidulation reaction cannot proceed to a point where the gel phase is avoided without altering the processing conditions. Therefore, the present invention provides a process for the controlled acidulation of the tall oil soap and means to avoid the gel phase during the processing. The process is conducted preferably on a continuous basis so that the gel phase can be passed through upon start-up and then avoided during steady-state operation.

The monitoring of the extent of acidification in the reactor 20 can be accomplished by various means. For example, the viscosity of the reaction can be monitored, or the extent of acidification can also be monitored by other chemical and physical analyses. In a preferred embodiment, the monitoring is by measuring the viscosity of the preliminary tall oil mixture either within the reactor 20 or between reactor 20 and reactor 40.

As shown in FIG. 1, the monitoring of the reaction mixture is by means of a viscosity meter 15. The viscosity meter 15 measures the viscosity of the reaction mixture within the reactor 20. Suitable viscosity meters that are commercially available include in-line vibrating devices such a Viscoliner® Model 1810 (Nametre Co., Metuchen, N.J.) and a Dynatrol viscometer (Automation Products Inc., Houston, Tex.). The reading from the viscosity meter 15 is then used to adjust the reaction conditions in the reactor 20 if necessary. The viscosity meter 15 is shown in FIG. 1 to be connected to a viscosity indicator controller 17, which in turn controls the setpoint of a flow indicator controller 18 which is connected to a flow transducer 19. The controller 18 is shown as controlling valve 21. Together the controllers 18 and 17 control and regulate the amount of carbon dioxide that is sent into the reactor 20 via line 23 as make up carbon dioxide in addition to the recycle carbon dioxide entering the reactor 20 via line 12. This control situation, known to one skilled in the art as cascade control, allows for the regulation of carbon dioxide into the reactor 20 to ensure that a predetermined extent of the acidification reaction is maintained to avoid the gel stage. During operation, if the extent of acidification in the reactor 20 begins to decrease below the critical level, thus initiating the gel phase with the accompanying increase in viscosity, this control mechanism allows for the introduction of carbon dioxide via line 23 into the reactor to increase the extent of the acidulation reaction beyond that level where the gel phase persists. The monitoring of the viscosity can also be accomplished by monitoring the preliminary tall oil mixture exiting the reactor 20 via line 32 by means of connecting the viscosity meter 15 to line 32.

The monitoring of the viscosity of the reaction mixture within the reactor 20 can also be used to adjust other reaction variables to ensure that the gel phase is avoided. For instance, the amount of tall oil soap and the amount of water added to the reactor 20 can be adjusted in response to the monitoring. If the acidulation reaction within the reactor 20 decreases and the onset of the gel phase is encountered, the flow rate of the tall oil soap can be decreased or the flow rate of the water, via line 16, can be increased. The flow rate of the aqueous tall oil soap solution may also be adjusted. The temperature and pressure of the vessel can also be adjusted in response to the monitoring to ensure that the extent of acidification is maintained beyond the gel phase. The temperature in the reactor 20 can be regulated by various means, for example, the temperature can be adjusted by use of a jacketed reactor 20 containing a heating or cooling fluid such as steam or water.

As shown in FIG. 1 the pressure can be controlled through the pressure transducer 6 connected to the pressure indicator controller 7 that controls valve 5 on line 8. This pressure relief system can also be used as a purging system to remove, or bleed-off, excess entrained air that is introduced into the process system primarily from the aqueous tall oil soap solution.

The reaction products within the reactor 20 include the tall oil acids, the unreacted tall oil soap, sodium bicarbonate and the neutral compounds. The flow rate of the preliminary tall oil mixture leaving the reactor 20 is controlled by a level transducer 25 and level indicator controller 27 which regulates the flow through valve 29. The reaction products are transferred through line 32 via pump 30 into reactor 40.

Reactor 40 is operated to provide further acidification of the preliminary tall oil solution produced in reactor 20 and is a means of reacting the preliminary tall oil mixture with carbon dioxide at a second process pressure that is higher than the first carbon dioxide contacting process pressure. The preliminary tall oil mixture is again contacted with carbon dioxide, via line 42, within reactor 40, under pressure. The reactor 40 preferably is operated under the conditions set forth in U.S. patent application Ser. No. 07/886,654. Thus, the pressure is generally between about 50 and about 800 psig, preferably between about 100 and about 300 psig, more preferably between about 150 psig and about 250 psig, and most preferably at about 250 psig. The temperature of the reactor 40 is generally between about 50° C. and about 125° C., preferably between about 65° C. and about 85° C., more preferably at about 75° C.

The separator 70 is operated preferably such that the separation of the organic phase (generally an upper layer) comprising crude tall oil and carbon dioxide and the aqueous phase (generally a lower layer) comprising sodium bicarbonate and carbon dioxide is conducted under pressures similar to those of the reactor 40. In a preferred process embodiment, the crude tall oil mixture from reactor 40 is transferred via line 46 to a point in the separator 70 approximately at the interface of the organic and aqueous layers.

The organic phase can be recovered via line 50 to the crude tall oil tank 52, and the crude tall oil product transferred therefrom via line 92. The aqueous phase can be recovered via line 54 to the bicarbonate tank 56 and the sodium bicarbonate product transferred therefrom via line 94. The extent of the acidulation reaction within the reactor 40 is similar to that as set forth in U.S. patent application Ser. No. 07/886,654, with conversion rates such that the amount of $H_2SO_4$ employed for final conversion is reduced by about 60%–95%, generally by about 70%–90%, preferably at least 80%, over processes employing $H_2SO_4$ as the sole acidulation agent. Thus, the extent of acidification in reactor 40 is generally from about 60–99 equivalent percent, preferably from about 70–95 equivalent percent, and more preferably from about 75–90 equivalent percent.

The carbon dioxide can be removed from the separator 70, in an embodiment wherein the separation is not necessarily under pressure, via valve 72 and line 74. When separation is conducted under atmospheric pressures, the excess carbon dioxide is recovered either prior to or during the separation step. When the separation is conducted under pressure, the carbon dioxide can be recovered from the tanks 52, 56 via lines 55 and 57 respectively.

The carbon dioxide that is recovered is directed via line 58 to be recycled to the process system. Preferably the carbon dioxide is sent through valve 80 to the blower 60. The pressure of the recycle carbon dioxide, generally recovered at about atmospheric pressures, is then increased by the blower 60 to provide a variable pressure in the reactor 20. The blower 60 generally provides for the increasing of the carbon dioxide to pressures of up to about 85 psig, generally up to about 65 psig, more preferably up to about 60 psig. A preferred operating range for the blower pressure is from about 5 psig to about 60 psig.

The carbon dioxide can also be recycled into a process system that does not employ the use of the reactor 20. In such a system the recycled carbon dioxide is sent through valve 82 via line 76 to a point before pump 30. The entire reactor 20 is not present in such a system and so the recycled carbon dioxide is contacted with the tall oil soap solution, entering the process via line 10a, after being brought up to the first contacting process pressure by blower 60a.

EXAMPLE 1

Steady-state operation was demonstrated on a pilot plant scale under conditions utilized for $CO_2$ recycle. Tall oil soap containing about 35% weight water was blended with water at a 1:1 ratio to yield an aqueous tall oil soap solution containing about 65% weight water. The aqueous tall oil soap solution was fed into a continuous stirred tank reactor at a rate of about 4 lb/min. Carbon dioxide was injected subsurface to the reaction mixture at a rate of 16 liters/minute (STP).

The reactor level was controlled to provide a hold up of 100 lbs. This yielded a residence time of about 25 minutes. The reactor contents were controlled at a temperature of about 85° C., and were vigorously mixed at an agitator speed of 250 rpm.

This resulted in a steady reaction pressure of about 28 psig, and an estimated extent of acidification of about 40 equivalent percent. The extent of acidification was estimated by comparing the ratio of carbon dioxide:soap to the ratio of HCl:soap from the "soap number" standard analysis as set forth hereinabove. In other words, the extent of acidification of the aqueous tall oil soap based upon the known molar amount of carbon dioxide used was interpolated from the standard HCl soap number analysis.

The viscosity of the reaction mixture was 45 cps as measured by the Viscoliner ® Model 181 Oscillation Viscometer manufactured by the Nametre Company. The viscosity of the reaction mixture was continuously monitored in a pump-around loop from the reactor. The temperature, pressure and extent of acidification in the loop were the same as those in the reactor. No gel phase was noted during the course of the reaction.

EXAMPLE 2

The presence of the gel phase in a continuous reactor operation was demonstrated, along with the benefit of monitoring the viscosity of the reaction mixture.

Figure 3:
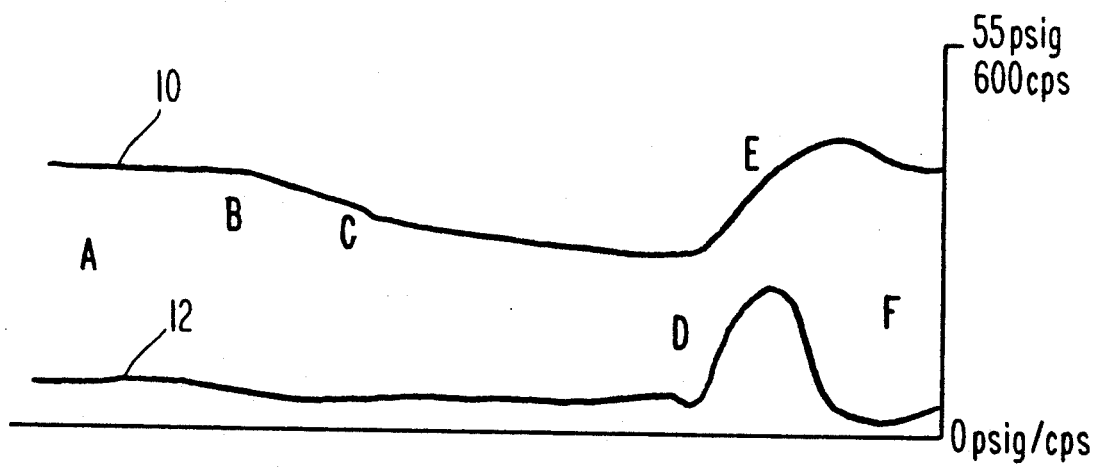
FIG. 3 shows the viscosity and pressure variations within an experimental reaction vessel during a simulated continuous acidulation process.

The reactor was operating under the steady-state conditions described in Example 1, with the viscosity at about 45 cps and the extent of acidification estimated at about 40 equivalent percent. These conditions correspond to region "A" in FIG. 3. In FIG. 3, line 10 pertains to pressure, while line 12 pertains to viscosity.

At region "B", a new drum of aqueous tall oil soap solution was charged to the feed tank. Unexpectedly, the aqueous soap solution feed rate increased to 5–6 lb/min., and the reactor headspace pressure began to drop gradually (region "C"). At region "D", the viscosity of the reaction mixture began to increase, and an increase in headspace pressure followed.

In a typical gas-liquid reaction, an increase in headspace pressure indicates an excess of gas, which would ordinarily indicate in this case that the flow rate of the carbon dioxide should be reduced to maintain the desired pressure. However, the corresponding increase in viscosity indicated that the pressure rise was due to the reduced mass transfer of the available carbon dioxide throughout the reaction mixture due to the onset of a gel phase within the reactor. It is believed that the increased feed rate of the aqueous soap solution decreased the extent of acidification within the reactor to about 25–30 equivalent percent, thereby initiating the onset of the gel phase. Since the gel phase forms as a result of the reduced extent of acidification, the flow rate of $CO_2$ was increased from 16 to 20 liters/minute (region "E"). The viscosity of the reaction mixture then decreased from a maximum of about 220 cps to about 40 cps (region "F"). The pressure stabilized at about 31 psig.

While not intending to be limited by the scope of the examples set for herein, Applicant has thus demonstrated that by monitoring one of the reaction parameters, for example viscosity, the extent of acidification can be controlled to avoid the formation of a gel phase during the acidulation process. Alternately, one might monitor the headspace pressure (region "C") to predict the onset of gelation and adjust the flow rate of either the carbon dioxide or the aqueous soap solution to avoid the gel phase.

What is claimed is:

1. A process for preparing crude tall oil from tall oil soap, comprising:
   (a) contacting an aqueous tall oil soap solution comprising tall oil soap with carbon dioxide at a first pressure to form a preliminary tall oil mixture comprising crude tall oil and tall oil soap;
   (b) contacting the preliminary tall oil mixture with carbon dioxide at a second pressure to form a crude tall oil mixture comprising crude tall oil and sodium bicarbonate, wherein the second pressure is higher than the first pressure;
   (c) recovering the crude tall oil and excess carbon dioxide from the crude tall oil mixture; and
   (d) recycling at least a portion of the recovered carbon dioxide to contacting step (a).

2. The process of claim 1 wherein the first pressure is from about 0–85 psig.

3. The process of claim 2 wherein the second pressure is from about 50–800 psig.

4. The process of claim 3 wherein the recovering step comprises separating an organic phase comprising the crude tall oil and carbon dioxide and an aqueous phase comprising sodium bicarbonate and carbon dioxide from the crude tall oil mixture at a pressure of from about 50–800 psig.

5. The process of claim 3 wherein the recovering step comprises separating an organic phase comprising the crude tall oil and an aqueous phase comprising sodium bicarbonate from the crude tall oil mixture at atmospheric pressure.

6. The process of claim 4 wherein the carbon dioxide is recovered from at least one of the organic phase and the aqueous phase.

7. The process of claim 5 wherein the carbon dioxide is recovered prior to or during the separation of the organic and aqueous phases.

8. The process of claim 1 further comprising deaerating the aqueous tall oil soap solution prior to contacting step (a).

9. A process for preparing crude tall oil from tall oil soap, comprising:
   (a) contacting an aqueous tall oil soap solution comprising tall oil soap with carbon dioxide at a first pressure to form a preliminary tall oil mixture comprising crude tall oil and tall oil soap, wherein the extent of acidification of the preliminary tall oil mixture is beyond a point at which a gel phase will form;
   (b) contacting the preliminary tall oil mixture with carbon dioxide at a second pressure to form a crude tall oil mixture comprising crude tall oil an sodium bicarbonate, wherein the second pressure is higher than the first pressure;
   (c) separating from the crude tall oil mixture an organic phase comprising crude tall oil and excess carbon dioxide and an aqueous phase comprising sodium bicarbonate and excess carbon dioxide;
   (d) recovering the organic phase and the aqueous phase;
   (e) recycling at least a portion of the excess carbon dioxide from at least one of the recovered organic and aqueous phases to contacting step (a); and
   (f) recovering the crude tall oil from the organic phase.

10. The process of claim 9 wherein the first pressure is from about 5–60 psig.

11. The process of claim 10 wherein the second pressure is from about 50–800 psig.

12. The process of claim 11 wherein the organic phase and the aqueous phase are separated under a third pressure similar to the second pressure.

13. The process of claim 9 wherein the extent of acidification of the preliminary tall oil mixture is at least about 20 equivalent percent.

14. The process of claim 9 further comprising deaerating the aqueous tall oil soap solution prior to contacting step (a).

15. A process for preparing crude tall oil from tall oil soap, comprising:
   (a) feeding (i) an aqueous tall oil soap solution comprising tall oil soap and water, and (ii) carbon dioxide into a first reactor;
   (b) reacting the aqueous tall oil soap solution with the carbon dioxide in the first reactor under a first pressure to produce a preliminary tall oil mixture comprising crude tall oil and tall oil soap while maintaining the extent of acidification at a predetermined level that is beyond a point at which a gel phase will persist;
   (c) transferring the preliminary tall oil mixture from the first reactor to a second reactor;
   (d) reacting the preliminary tall oil mixture with excess carbon dioxide within the second reactor, under a second pressure that is higher than the first pressure, to form a crude tall oil mixture comprising crude tall oil and sodium bicarbonate;
   (e) recycling a portion of the excess carbon dioxide from step (d) to the first reactor; and
   (f) recovering the crude tall oil from the crude tall oil mixture.

16. The process of claim 15 further comprising monitoring the extent of acidification of the preliminary tall oil mixture, wherein the reaction conditions of the first reactor comprise the tall oil soap feed rate, the water feed rate, the aqueous tall oil soap solution feed rate, the carbon dioxide feed rate, the temperature of the first reactor, and the pressure of the first reactor, and adjusting at least one of the reaction conditions in the first reactor in response to said monitoring to maintain the predetermined extent of acidification.

17. The method of claim 16 wherein the monitoring comprises monitoring the viscosity of the preliminary tall oil mixture.

18. The process of claim 17 wherein the adjusting of the reaction conditions comprises adjusting the feed rate of at least one of the carbon dioxide, aqueous tall oil soap solution, tall oil soap, or water, into the first reaction vessel.

19. The process of claim 18 wherein the first pressure is from about 0-85 psig and the second pressure is from about 50-800 psig.

20. The process of claim 19 wherein the viscosity of the preliminary tall oil mixture is maintained below about 10,000 cps, as determined at low shear conditions.

21. The process of claim 19 further comprising allowing the crude tall oil mixture to separate, under a pressure of from about 50-800 psig, into an organic layer comprising crude tall oil and an aqueous layer comprising sodium bicarbonate.

22. The process of claim 21 wherein the extent of acidification of the preliminary tall oil mixture is at least about 20 equivalent percent.

23. The process of claim 22 wherein the aqueous tall oil soap solution is deareated prior to being fed into the first reactor.

* * * * *